United States Patent
Dunham et al.

(10) Patent No.: US 10,552,212 B2
(45) Date of Patent: Feb. 4, 2020

(54) DATA PROCESSING

(71) Applicant: ARM Limited, Cambridge (GB)

(72) Inventors: Curtis Glenn Dunham, Austin, TX (US); Jonathan Curtis Beard, Austin, TX (US); Roxana Rusitoru, Cambridge (GB)

(73) Assignee: ARM LIMITED, Cambridge (GB)

( * ) Notice: Subject to any disclaimer, the term of this patent is extended or adjusted under 35 U.S.C. 154(b) by 497 days.

(21) Appl. No.: 15/361,819

(22) Filed: Nov. 28, 2016

(65) Prior Publication Data
US 2018/0150321 A1    May 31, 2018

(51) Int. Cl.
G06F 9/48        (2006.01)
G06F 9/46        (2006.01)

(52) U.S. Cl.
CPC .......... G06F 9/4881 (2013.01); G06F 9/461 (2013.01)

(58) Field of Classification Search
CPC . G06F 9/46; G06F 9/461; G06F 9/462; G06F 9/463; G06F 9/48; G06F 9/4843; G06F 9/485; G06F 9/4881; G06F 12/0815; G06F 12/0842
USPC .................................. 712/228, 229; 718/108
See application file for complete search history.

(56) References Cited

U.S. PATENT DOCUMENTS

| | | | | |
|---|---|---|---|---|
| 5,701,503 A | * | 12/1997 | Singh | G06F 12/0897 711/113 |
| 6,101,599 A | * | 8/2000 | Wright | G06F 9/461 712/228 |
| 6,240,504 B1 | * | 5/2001 | Boutaud | G01R 31/318536 710/16 |
| 6,973,650 B1 | * | 12/2005 | Parkes | G06F 9/4843 711/118 |

(Continued)

FOREIGN PATENT DOCUMENTS

| | | |
|---|---|---|
| EP | 1 570 352 | 9/2005 |
| WO | WO 2008/061154 | 5/2008 |

OTHER PUBLICATIONS

Tarakji, Ayman, David Hebbeker and Lyubomir Georgiev, "Efficient Resource Scheduling for Big Data Processing on Accelerator-based Heterogeneous Systems," Feb. 11, 2015, 25pp, last retrieved from https://pdfs.semanticscholar.org/a91c/a6fc3e72c1d6597a1a68cecba0d2b404e9b9.pdf on Sep. 16, 2019. (Year: 2015).*

(Continued)

Primary Examiner — Andrew M. Lyons
(74) Attorney, Agent, or Firm — Nixon & Vanderhye PC

(57) ABSTRACT

Data processing apparatus comprises a group of two or more processing elements configured to execute processing instructions of a program task; the processing elements being configured to provide context data relating to a program task following execution of that program task by that processing element; and to receive context data, provided by that processing element or another processing (Continued)

element, at resumption of execution of a program task; in which a next processing element of the group to execute a program task is configured to receive a first subset of the context data from a previous processing element to execute that program task and to start to execute the program task using the first subset of the context data; and in which the next processing element is configured to receive one or more items of a second, remaining, subset of the context data during execution of the program task by that processing element.

17 Claims, 9 Drawing Sheets

(56) References Cited

U.S. PATENT DOCUMENTS

| | | | |
|---|---|---|---|
| 7,373,646 B1 | 5/2008 | Smith | |
| 7,484,208 B1 | 1/2009 | Nelson | |
| 7,493,621 B2 | 2/2009 | Bradford | |
| 7,577,822 B2* | 8/2009 | Vorbach | G06F 15/7867 712/34 |
| 8,037,474 B2* | 10/2011 | Bates | G06F 9/4881 712/220 |
| 8,095,782 B1* | 1/2012 | Danskin | G06F 9/5088 712/228 |
| 8,561,078 B2* | 10/2013 | Sandstrom | G06F 15/80 710/317 |
| 8,924,596 B1* | 12/2014 | Beeson | G06F 3/0659 710/5 |
| 9,191,435 B2* | 11/2015 | Nassi | H04L 67/10 |
| 9,304,834 B2* | 4/2016 | Munshi | G06F 9/541 |
| 9,619,284 B2* | 4/2017 | Sakarda | G06F 9/3885 |
| 9,658,877 B2* | 5/2017 | Barwick | G06F 9/461 |
| 2005/0010728 A1 | 1/2005 | Piry | |
| 2006/0168347 A1 | 7/2006 | Martin | |
| 2006/0259749 A1* | 11/2006 | Veale | G06F 9/3885 712/226 |
| 2006/0294347 A1* | 12/2006 | Zou | G06F 9/3009 712/244 |
| 2007/0244876 A1* | 10/2007 | Jin | G06F 16/254 |
| 2008/0140971 A1* | 6/2008 | Dankel | G06F 12/0284 711/163 |
| 2008/0201561 A1* | 8/2008 | Bates | G06F 9/463 712/228 |
| 2008/0263323 A1* | 10/2008 | Mould | G06F 9/3836 712/42 |
| 2008/0270653 A1 | 10/2008 | Balle | |
| 2009/0172411 A1* | 7/2009 | Kershaw | G06F 21/53 713/189 |
| 2009/0234987 A1 | 9/2009 | Lee | |
| 2010/0023666 A1* | 1/2010 | Mansell | G06F 9/4812 710/267 |
| 2010/0161948 A1 | 6/2010 | Abdallah | |
| 2011/0083130 A1 | 4/2011 | Boldyrev et al. | |
| 2011/0265084 A1 | 10/2011 | Knowles et al. | |
| 2011/0271126 A1 | 11/2011 | Hill | |
| 2011/0307681 A1* | 12/2011 | Piry | G06F 9/30098 711/203 |
| 2012/0233410 A1 | 9/2012 | Fu | |
| 2012/0260239 A1* | 10/2012 | Martinez Canedo | G05B 19/05 717/149 |
| 2013/0179666 A1 | 7/2013 | Yamashita | |
| 2013/0339648 A1* | 12/2013 | Zetterman | G06F 9/30181 711/170 |
| 2014/0032886 A1* | 1/2014 | Santis | G06F 9/30145 712/229 |
| 2014/0082624 A1 | 3/2014 | Iwabuchi | |
| 2014/0157287 A1 | 6/2014 | Howes et al. | |
| 2014/0201761 A1* | 7/2014 | Dalal | G06F 13/16 718/108 |
| 2014/0258693 A1 | 9/2014 | Lindholm et al. | |
| 2014/0298338 A1* | 10/2014 | Doi | G06F 9/4856 718/1 |
| 2014/0304708 A1 | 10/2014 | Martz et al. | |
| 2014/0351519 A1 | 11/2014 | Munoz | |
| 2014/0359636 A1 | 12/2014 | Xu | |
| 2014/0365662 A1 | 12/2014 | Dave | |
| 2015/0052329 A1* | 2/2015 | Fujinami | G06F 12/1027 711/207 |
| 2015/0234679 A1* | 8/2015 | Moyer | G06F 9/4856 718/108 |
| 2015/0254104 A1 | 9/2015 | Kessler | |
| 2015/0277920 A1 | 10/2015 | Bradbury | |
| 2016/0062797 A1* | 3/2016 | Holt | G06F 9/3009 718/108 |
| 2016/0098303 A1 | 4/2016 | Balakrishnan | |
| 2016/0239346 A1 | 8/2016 | Kipp | |
| 2017/0034272 A1* | 2/2017 | Kazi | G06F 16/122 |
| 2017/0083998 A1* | 3/2017 | Acharya | G06T 1/60 |

OTHER PUBLICATIONS

International Search Report and Written Opinion of the International Searching Authority dated Feb. 9, 2018 in PCT/GB2017/053370, 17 pages.
International Search Report and Written Opinion of the International Searching Authority dated Feb. 13, 2018 in PCT/GB2017/053374, 14 pages.
International Search Report and Written Opinion of the International Searching Authority dated Feb. 19, 2018 in PCT/GB2017/053371, 16 pages.
U.S. Appl. No. 15/361,770, filed Nov. 28, 2016, Inventor: Dunham et al.
U.S. Appl. No. 15/361,871, filed Nov. 28, 2016, Inventor: Dunham et al.
K.K. Rangan et al, "Thread Motion: Fine-Grained Power Management for Multi-Core Systems" *ISCA '09*, Jun. 20-24, 2009, 12 pages.
Office Action dated Oct. 19, 2018 in co-pending U.S. Appl. No. 15/361,871, 26 pages.
Office Action dated Apr. 11, 2019 in co-pending U.S. Appl. No. 15/361,871, 22 pages.

* cited by examiner

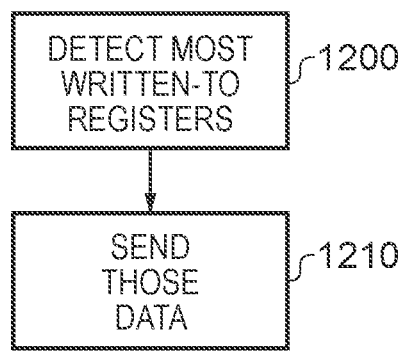
FIG. 12
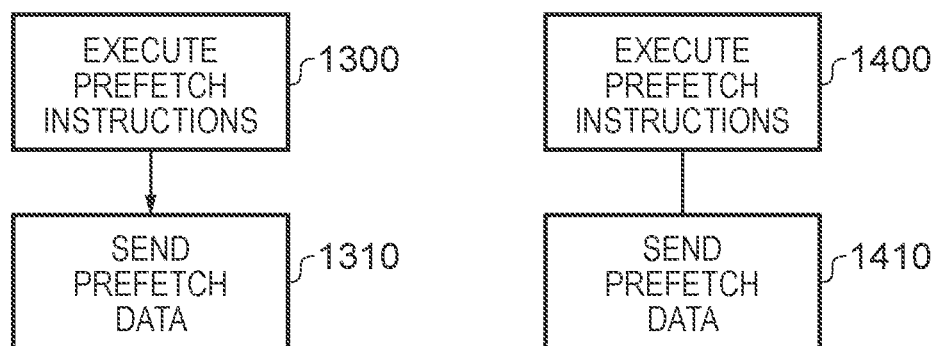
FIG. 13
FIG. 14

DATA PROCESSING

BACKGROUND

This disclosure relates to data processing.

In arrangements of one or more interconnected processing elements, a program task such as a thread can be executed by processing elements in successive portions, possibly interspersed with portions of execution of other program tasks. Execution can be passed from one processing element to another. To enable this, a process referred to as context switching may take place.

In a context switch, each processing element is configured to save context data relating to a program task following execution of that program task by that processing element; and to load context data, previously saved by that processing element or another of the processing elements, at resumption of execution of a program task.

SUMMARY

In an example arrangement there is provided a data processing apparatus comprising:

a group of two or more processing elements configured to execute processing instructions of a program task;

the processing elements being configured to provide context data relating to a program task following execution of that program task by that processing element; and to receive context data, provided by that processing element or another processing element, at resumption of execution of a program task;

in which a next processing element of the group to execute a program task is configured to receive a first subset of the context data from a previous processing element to execute that program task and to start to execute the program task using the first subset of the context data; and in which the next processing element is configured to receive one or more items of a second, remaining, subset of the context data during execution of the program task by that processing element.

In another example arrangement there is provided a data processing apparatus comprising:

a group of two or more processing means for executing processing instructions of a program task;

the processing means being operable to provide context data relating to a program task following execution of that program task by that processing means; and to receive context data, provided by that processing means or another processing means, at resumption of execution of a program task;

in which a next processing means of the group to execute a program task is operable to receive a first subset of the context data from a previous processing means to execute that program task and to start to execute the program task using the first subset of the context data; and in which the next processing means is operable to receive one or more items of a second, remaining, subset of the context data during execution of the program task by that processing means.

In another example arrangement there is provided a method comprising:

receiving, by a next processing element of a group of two or more processing elements to execute a program task, a first subset of context data relating to execution of a program task following execution of that program task by a previous processing element and to start to execute the program task using the first subset of the context data; and the next processing element receiving one or more items of a second, remaining, subset of the context data during execution of the program task by that processing element.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 12 to 14 are schematic flowcharts illustrating the transfer of context data;

DESCRIPTION OF EMBODIMENTS

Figure 1:
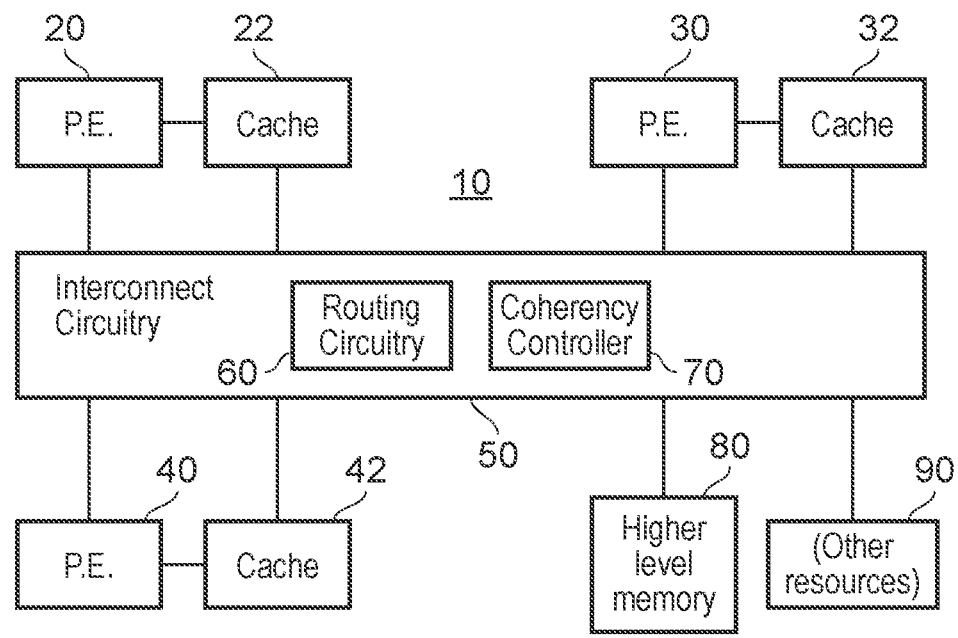
FIG. 1 schematically illustrates a data processing apparatus.

Before discussing the embodiments with reference to the accompanying figures, the following description of embodiments is provided.

An example embodiment provides data processing apparatus comprising: a group of two or more processing elements configured to execute processing instructions of a program task; the processing elements being configured to provide context data relating to a program task following execution of that program task by that processing element; and to receive context data, provided by that processing element or another processing element, at resumption of execution of a program task; in which a next processing element of the group to execute a program task is configured to receive a first subset of the context data from a previous processing element to execute that program task and to start to execute the program task using the first subset of the context data; and in which the next processing element is configured to receive one or more items of a second, remaining, subset of the context data during execution of the program task by that processing element.

This arrangement has the advantage that execution of the program task can be started quickly (without the need to transfer all of the context data before execution can start) but that any items of context data still required can be transferred during execution by the next processing element. For example, a combination of a so-called push and a so-called pull mechanism could be used to provide a transfer of the context data. In some examples, an initial portion of the context data could be pushed to the next processing element, and at least some of a remaining portion could be acquired by the next processing element at the instigation of the next processing element by a pull mechanism. An example of a transfer mechanism is to use a coherence arrangement as discussed below, for example including processor registers as coherence end points.

In at least some examples, one or more of: (i) the next processing element; (ii) the previous processing element; (iii) a scheduler (either hardware or software); and (iv) an operating system overseeing at least some processing operations of the apparatus is configured to initiate the transfer of the one or more items of the second subset of the context data during execution of the program task by that processing element. This arrangement allows the next processing element to request (for example, as a pull data transfer mechanism) items of context data which it requires during execution.

The second subset of the context data may comprise configuration data (such as, for example, register mapping data indicating a mapping between architectural and physical aspects, such as registers) which is required for execution of one or more types of program instructions by the processing elements; and the next processing element may be configured to initiate the transfer of such configuration data in response to initiation of execution by the next processing element of a program instruction of the one or more types of program instructions. For example, the next processing element may be configured to pause the execution the program instruction of the one or more types of program instructions until the configuration data has been received. As mentioned, an example in which this can be useful is where the configuration data comprises mapping data defining a mapping between architectural and physical aspects (such as registers) of the processing elements.

In at least some examples, the next processing element is configured to receive the first subset of the context data via a hardware mediated transfer prior to execution of the program task.

An example technique to transfer context data is by means of coherent memory circuitry storing one or more copies of data accessible by each of the processing elements, so that data written to a memory address in the coherent memory circuitry by one processing element is consistent with data read from that memory address in the coherent memory circuitry by another of the processing elements; in which the context data for a program task is stored by a memory region in the coherent memory circuitry; and in which each processing element is configured to take exclusive ownership of (for example, exclusive write access to) a memory region corresponding to a program task while that processing element is executing that program task.

Although separate memory such as cache memory can be used, in at least some examples the coherent memory circuitry includes one or more processor registers at each processing element; and each processing element is configured to store at least part of the context data used by that processing element in the one or more processor registers.

In at least some examples, the coherent memory circuitry is configured to allocate control of memory backed register zones represented by groups of one or more addresses; and the memory region for which the processing element takes exclusive control comprises one or more of the memory backed register zones.

In example arrangements, selection circuitry (for example, implemented by the previous processing element) may be configured to select at least some of the first subset of the context data for transmission by the previous processing element to the next processing element. This can allow for context data known, considered or detected to be relevant to the next processing element to be prioritised for passing to the next processing element. An example way of detecting which context data to send is by the selection circuitry being configured to select at least some of the first subset in response to detection of a cost function associated with the context data, for example by detecting accesses by the previous processing element to items of context data and selecting at least some of the first subset of the context data in response to the detected accesses. For example, the selection circuitry may be configured to select at least some of the first subset of the context data as one or more most-accessed items of context data. For example, the detected accesses may be write accesses.

In at least some examples, either instead of the selection and/or push mechanism just described, or in addition to it (for example, in an arrangement in which the first subset comprises a predetermined quantity of data so that some of the first portion can be provided by each such mechanism) the next processing element may be configured to execute one or more load instructions, the load instructions being configured to perform one or both of: acquiring one or more items of the first subset of context data; and acquiring one or more items of the second subset of context data. These arrangements can allow for the rapid initiation of loading context data. The combination technique just mentioned can provide the advantages of the technique using load instructions with the advantages of the technique offered by the selection circuitry.

In at least some examples, the data items for inclusion in the context data can be set according to a common definition which applies to each of the processing elements in the group. This can provide context swapping between otherwise disparate processing elements. An example involves each processing element having respective associated format definition data to define one or more sets of data items for inclusion in the context data; and the apparatus comprising format selection circuitry to communicate the format definition data of each of the processing elements with others of the processing elements and to determine, in response to the format definition data for each of the processing elements, a common set of data items for inclusion in the context data. In at least some examples, the set of data items defined by the format definition data for each processing element may be indicative of a set of processing capabilities of that processing element.

Another example embodiment provides data processing apparatus comprising:

a group of two or more processing means for executing processing instructions of a program task;

the processing means being operable to provide context data relating to a program task following execution of that program task by that processing means; and to receive context data, provided by that processing means or another processing means, at resumption of execution of a program task;

in which a next processing means of the group to execute a program task is operable to receive a first subset of the context data from a previous processing means to execute that program and to start to execute the program task using the first subset of the context data; and in which the next processing means is operable to receive one or more items of a second, remaining, subset of the context data during execution of the program task by that processing means.

Another example embodiment provides a method comprising:

receiving, by a next processing element of a group of two or more processing elements to execute a program task, a first subset of context data relating to execution of a program task following execution of that program task by a previous processing element and to start to execute the program task using the first subset of the context data; and the next processing element receiving one or more items of a second, remaining, subset of the context data during execution of the program task by that processing element.

Referring now to the drawings, FIG. 1 schematically illustrates a data processing apparatus comprising: a plurality of processing elements (as examples of data handling nodes 20, 30, 40) and interconnect circuitry 50 connected to the plurality of data handling nodes. The interconnect circuitry comprises data routing circuitry 60 for controlling and monitoring data handling transactions as between the various data handling nodes and a coherency controller 70, to be discussed below.

The data handling nodes 10 . . . 20 can include various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. In the present example they are processing elements. However, the present embodiments envisage arrangements with only one processing element and cache memory, and arrangements with more than one processing element. Indeed, a feature of the present arrangements is that in use, processing elements and/or cache memory devices may be added to the interconnected arrangement (for example by being newly connected or newly enabled for operation (such as powered up, reset or the like)), or may be removed from the interconnected arrangement (for example by being physically removed from the interconnected arrangement or by being logically removed, for example by being powered down).

Each processing element in this example is associated with a cache memory 22, 32, 42. The cache memories store locally and quickly accessible copies of data, for example data held in a higher level memory 80 such as a main memory or a higher level cache memory.

Other processing or data handling resources 90 may also be connected to the interconnect circuitry 50.

The data processing apparatus of FIG. 1 may be implemented as a single integrated circuit, for example as a so-called system on a chip (SoC) or a so-called network on a chip (NoC). Alternatively, the data processing apparatus of FIG. 1 may be implemented as multiple discrete and interconnected systems.

The data processing apparatus of FIG. 1 is just one example of how a set of processing elements may be interconnected. In other examples, processing elements are interconnected by a bus, network, memory, RDMA (remote direct memory access, allowing a processing element of one computer to access the memory of another processing element of another computer without the involvement of either device's operating system), or equivalent device. Therefore, the interconnect circuitry 50 is simply an example indicative of various types of networking, interconnecting, bus or other circuitry to interconnect processing elements to allow the exchange of data and the switching of task execution in the manner described here.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a cache memory device 22 by one of the data handling nodes (such as the node 20). Other nodes (such as the nodes 30, 40) may be processing elements having their own respective caches 32, 42 which, depending on the nature of the processing element operations, may store one or more copies of data which is also held in the cache memory 22. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, the caches 22, 32, 42 and the coherency controller 70 provide coherent memory circuitry storing one or more copies of data accessible by each of the processing elements (for example, each of the processing elements connected via the interconnect circuitry 50), so that data written to a memory address in the coherent memory circuitry by one processing element is consistent with data read from that memory address in the coherent memory circuitry by another of the processing elements.

In at least some examples, the coherent memory circuitry comprises one or more coherent cache memories (22, 32, 42) and the coherent memory circuitry is configured to store multiple copies of the data accessible by each of the processing elements.

In the example situation discussed above of devices being added to or subtracted from the interconnected arrangement, the coherency controller 70 can be arranged to react to the addition of a device by adding it to the so-called coherency domain, and bringing it into coherent operation with other devices in the interconnected arrangement, and to react to the subtraction of a device by reconfiguring the coherent domain to operate in the absence of that device. This reconfiguring may involve first ensuring (before the device is removed) that any data updates at that device are appropriately propagated to other coherent devices and/or the higher level memory.

The data routing circuitry 60 and/or the coherency controller 70 include various mechanisms and circuitry to provide for coherent operation. Examples of these will be discussed below.

An example processing element in the arrangement of FIG. 1 may make reference to data stored in an associated cache memory, with both the processing element and the cache memory being in communication with the interconnect circuitry. The cache memory may store copies of information held in the higher level memory 80. In some instances, the two copies can be the same, for example if a copy has been cached during a memory read operation. In other instances, circumstances could arise which would lead to copies differing from one another, for example if a data write operation has been carried out by a particular processing element (such as the processing element 20) with respect to the copy of a data item stored in the cache 22. In a system of multiple caches, there is a need to ensure that before one version of a data item is accessed, any changes which have been implemented in respect of other versions are fully implemented for all copies.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this include (for example) the use of a so-called "snoop filter".

The term "snoop filter" is a historical one and is used here to refer to a control device forming part of the coherency controller 70 having an associated "directory", where the directory stores information indicating which data is stored in which cache, and the snoop filter itself at least contributes to the handling of data accesses to cached information so as to provide a cache coherence function.

For example, a snoop filter, having a directory as discussed above and a register indicating those cache memories which are currently part of the coherency control arrangement (otherwise referred to as being in the coherent system or in the coherent domain) forms part of the coherency controller 70 associated with the routing circuitry 60. The routing circuitry 60 is in data communication with the one or more cache memories.

The snoop filter handles at least a part of a process under which, when any of the data handling nodes 20 . . . 40 intends to access or modify data which is stored as a cache line in any of the cache memories, that node obtains permission to do so. As part of this process, the snoop filter checks whether any other cache memories have a copy of the line which is to be modified. If any other copies are in existence at other cache memories, then those copies need to be cleared and invalidated. If those copies themselves contain modifications to the stored data in that line, then in at least some circumstances, the coherency controller 60 (or the snoop filter itself) instructs the cache memory to write that line back to main memory.

In the case of a read access by a node with respect to data stored in a cache memory, it is important that the node 20 . . . 40 requesting the read has access to the latest correct version of the cached data. The coherency controller 70 oversees this process so that if another cache has a recently-modified version of the required data, that other cache writes back the modified version and/or forwards a copy of the modified version for caching at the currently requesting node.

The coherency controller 70 including the snoop filter therefore provides an example of a cache coherency controller configured to coordinate, amongst the cache memories, an access to a memory address by one of the cache memories when the directory indicates that another of the cache memories is caching that memory address. The snoop controller stores or provides a directory such as the directory mentioned above indicating, for memory addresses cached by one or more of a group of one or more cache memories connectable in a coherent cache structure, which of the cache memories are caching those memory addresses.

The apparatus may operate in association with an operating system which oversees at least some processing operations of the apparatus.

Figure 2:
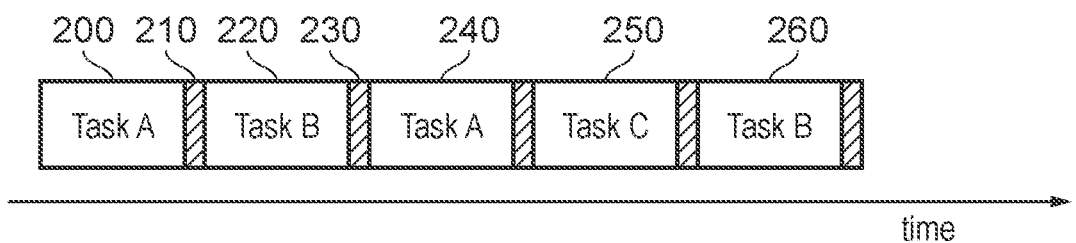
FIG. 2 schematically illustrates task switching by a processing element.

FIG. 2 schematically illustrates task switching by a processing element such as one of the processing elements 20 . . . 40 of FIG. 1.

In general terms, program functions are carried out by executing program code and referred to here as "tasks". An example of a task is a processing thread. Execution of a task may take place for a particular period and then the processing element can switch to execution of a different task before, potentially, returning to the first task for another period and so on.

In between these periods, a so-called context switch takes place. The context switch involves saving a current state of the processing element at the end of execution of a particular task and restoring a previously saved stated of the processing element in preparation for a period of execution of another task. Overall, this can give the impression that the processing element is handling multiple programs or "threads" at once, whereas in fact it is executing small portions of each task intermittently.

In the example of FIG. 2, the processing element executes, for a period 200, a first task (task A). There is then a short period 210 during which the context switch referred to above takes place. Here, the processing element saves context data relating to the program task A following execution of that program task by the processing element, and loads context data, previously saved by that processing element or another processing element, at resumption of execution of a next task (task B) in a period 220.

So, it can be seen that a particular processing element may execute a particular task for a period, but then having saved the context data relating to that task, execution of that task may next be taken up in a subsequent period by that processing element another of the interconnected processing elements.

At the end of execution of task B in the period 220, a context switch occurs in a period 230 followed by execution of task A again in a period 240, with subsequent tasks in this example being task C in a period 250 and task B in a period 260.

The arrangement of FIG. 2 relates to one of the processing elements. In the system of FIG. 1, there are three example processing elements and each may be switching between tasks in the manner shown. A particular task may be executed by successive (though not necessarily contiguous) periods of execution on any of the processing elements, with the saved context data being used to facilitate the switching of the task from one processing element to another.

Note that in some examples, the "next processing element" can be the same processing element as the "previous processing element". A task can be terminated at one processing element by a timeout, an internal or external signal (such as an interrupt), a scheduler command, an operating system command (by an operating system overseeing at least some processing activities or operations of the apparatus) or the like.

Figure 3:
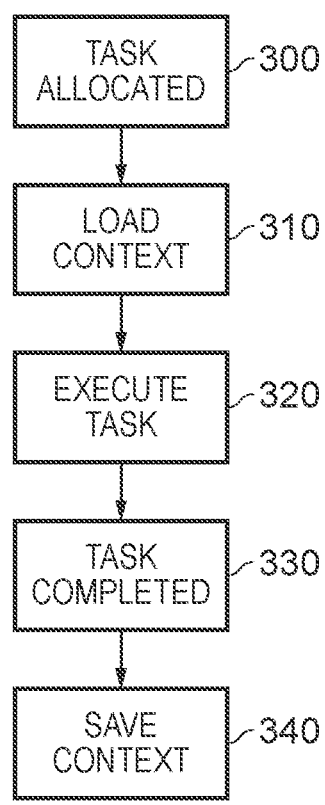
FIG. 3 is a schematic flowchart illustrating task execution.

FIG. 3 is a schematic flowchart illustrating some basic aspects of task execution in the manner described with reference to FIG. 2.

At step 300, a task is allocated to a particular processing element. The allocation of tasks is carried out by scheduling circuitry in one example, and this will be discussed further below.

At a step 310, the processing element loads previously-saved context data relating to that task (saved by the previous processing element to execute that task, whether or not that is the same processing element as the one about to execute the task) and at a step 320 executes the task for a period of time.

Note that the steps 310, 320 may overlap in time. A certain amount of context data may be required in order to start the execution of a task, in response to receipt of which the next processing element can start to execute the task, but other items of context data may be loaded after execution has started or may even be deferred until they are required (a so-called "lazy" loading of context data). This arrangement can provide for potentially faster context switching because it can reduce the amount of context data which has to be loaded before task execution can even start, so allowing execution to start sooner than would be possible if every possible item of context data were first loaded before commencing execution.

The execution of the task can continue until, for example, a processor interrupt is received which may be due to an external interrupt situation or may be in response to a timer indicating that the period of time allocated to that particular instance of execution of that task has come to an end. At a step 330, that instance of execution of that task is completed and, following execution of that program task, context data is saved at a step 340. The process of FIG. 3 may then be restarted by that processor in respect of a next task to be executed.

Figure 4:
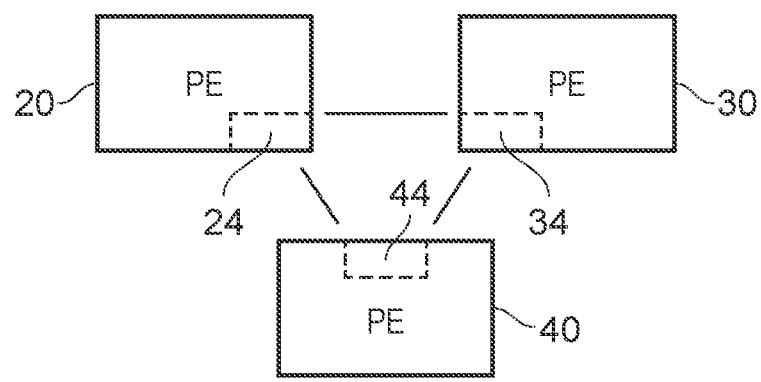
FIGS. 4 to 6 schematically illustrate implementations of scheduling circuitry.
Figure 5:
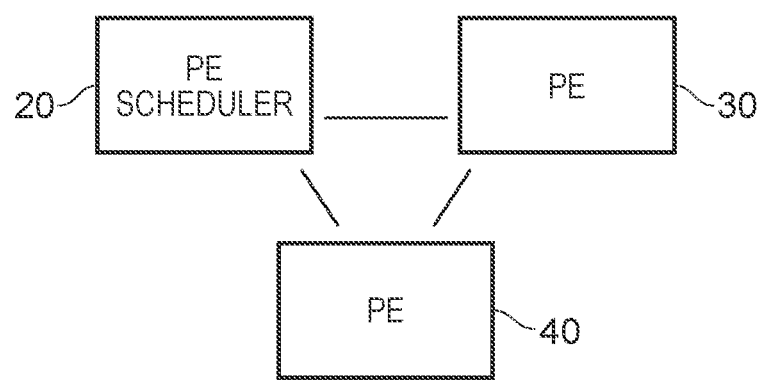
Figure 6:
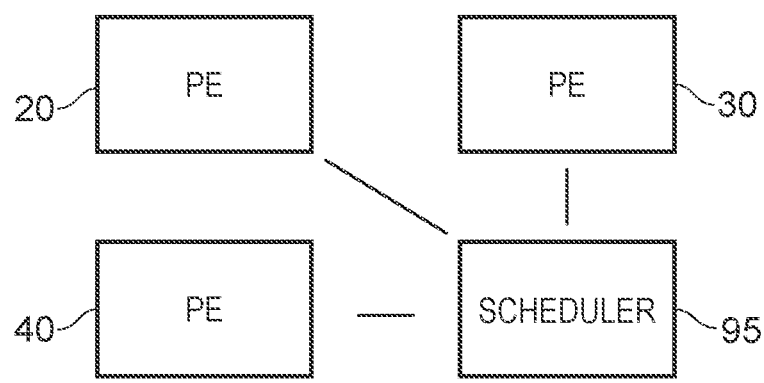

FIGS. 4 to 6 schematically illustrate example implementations of scheduling circuitry.

In each of FIGS. 4 to 6 the three example processing elements 20, 30, 40 are shown. Other parts of the circuitry of FIG. 1 are not shown, as this description relates just to the interactions between the processing elements.

The scheduling of tasks for execution by the processing elements can be carried out in various ways, for example at least in part under the control of an operating system overseeing processing resources of the system. In brief, in FIG. 4 the operation to schedule tasks and to select a context format (to be discussed further below) is distributed between all of the processing elements connected to the current network, as indicated by the broken line portions 24, 34, 44 indicating that a part of the functionality of each processing element is provided to carry out the scheduling process.

In FIG. 5, one processing element, in this example the processing element 20, is dedicated to providing the scheduling function.

In FIG. 6, a separate device 95 connected to the interconnect 50 of FIG. 1 is provided to give the scheduling function.

Therefore FIGS. 4 to 6 provide examples of hardware or software scheduling.

Figure 7A:
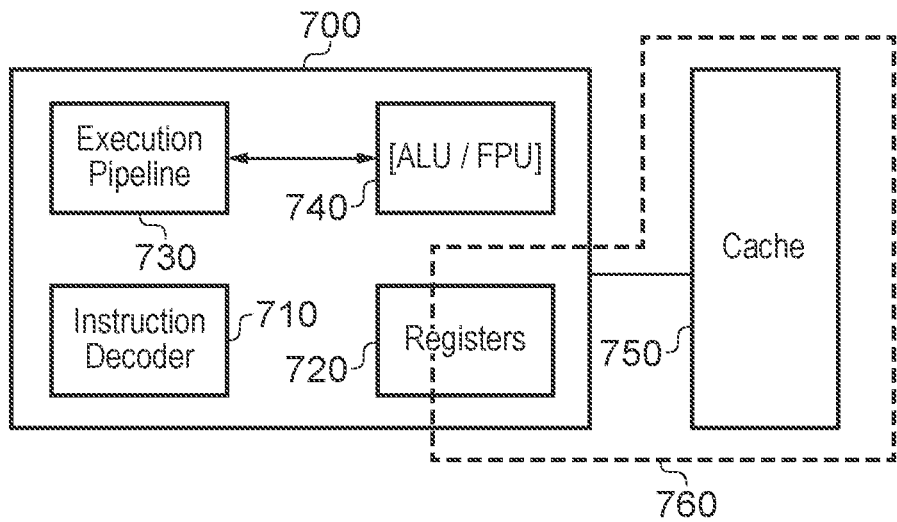
FIGS. 7a to 7c schematically illustrate a processing element.

FIG. 7a schematically illustrates a processing element 700, for example for use as one of the processing elements 20, 30, 40. Only some features of the processing element are shown here which are relevant to the present description. The skilled person will understand that a processing element may comprise other features which are not shown in FIG. 7.

The processing element comprises an instruction decoder 710, one or more registers 720, an execution pipeline 730 and a specialised computational unit such as an arithmetic logic unit or a floating point unit 740. A cache memory 750 associated with the processing element is also shown.

A broken line 760 indicates the extent of a coherence end point associated with that processing element. In the example of FIG. 7a, at least some of the registers 720 are included within the coherence mechanism. In fact all of the registers could be included; the illustration of part of the box 720 being included within the broken line 760 is merely to illustrate that not all of the registers have to be so-included.

Previously proposed arrangements have not included processor registers within the coherence mechanism. Such a feature is explicitly provided by embodiments of the present disclosure. Examples of the effect of the registers being included within the coherence mechanism are as follows. The previous processing element can initiate a write to the coherence mechanism (which is often—or at least may be—backed by a cache memory) as part of the coherence operation, which can cause the contents of the registers held at that processing element to be synchronized with other copies of that data being accessed elsewhere, for example at corresponding registers of the next processing element. This is how a push transfer can be implemented. Similarly, a load instruction executed at the next processing element (for example, executed micro-architecturally in response to a register request) can load the contents of the memory addresses represented by those registers, again causing (by the coherence mechanism) a transfer of the data held by the previous processing element to the next processing element.

Figure 7B:
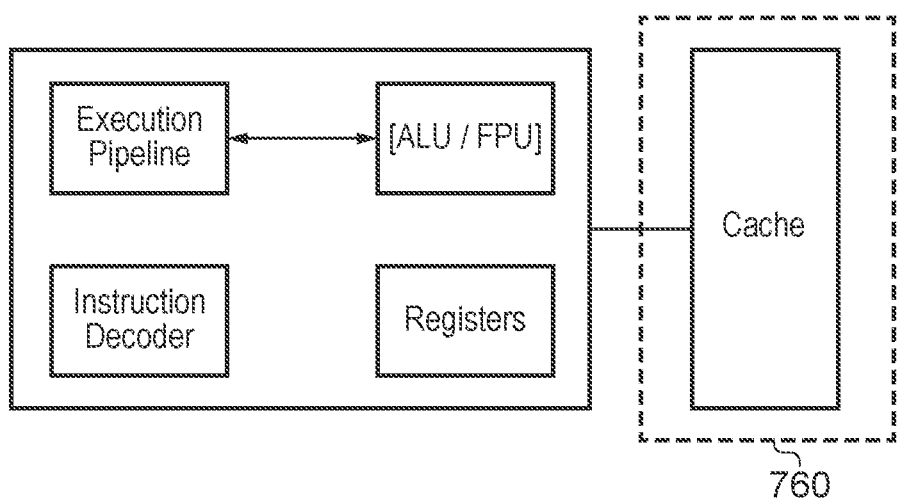

FIG. 7b schematically illustrates another arrangement in which the registers are not included within the coherence end point.

Figure 7C:
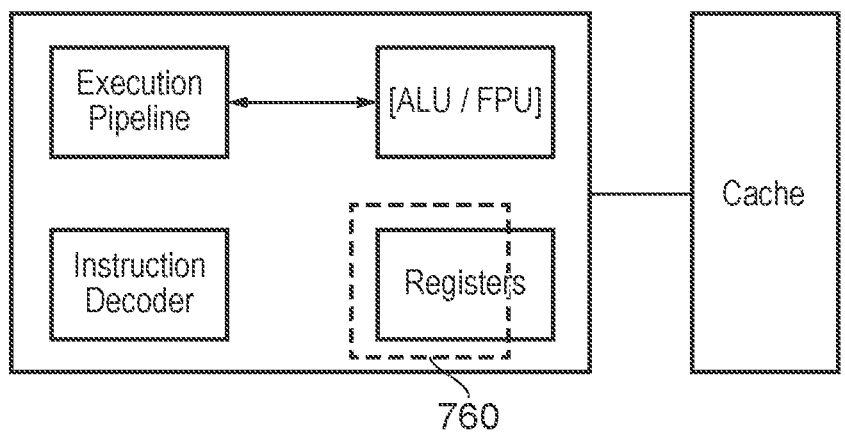

FIG. 7c schematically illustrates another arrangement in which the registers are included within a coherence end point.

Figure 8:
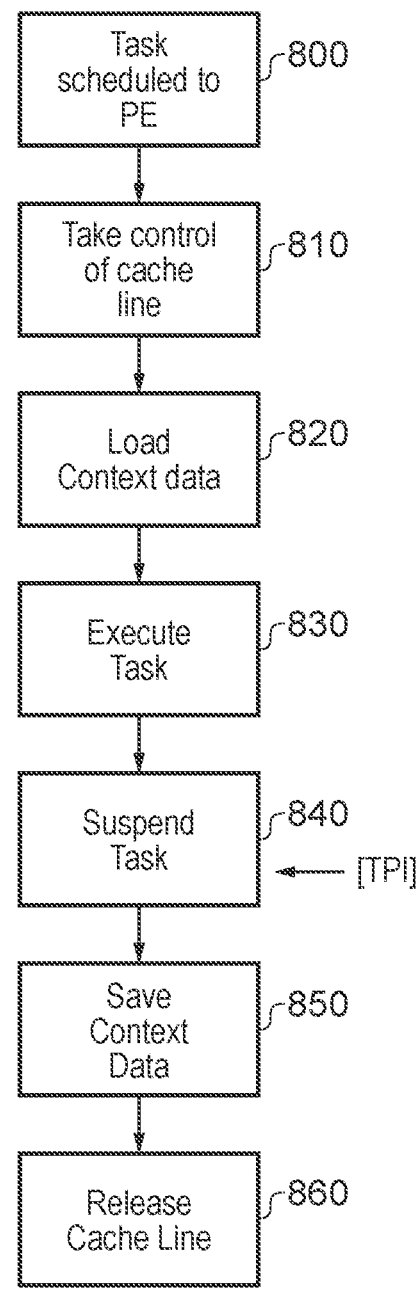
FIG. 8 is a flowchart schematically illustrating task switching.

FIG. 8 is a schematic flowchart illustrating task execution, providing more detail than the flowchart of FIG. 3 discussed above.

In FIG. 8, the process by which context data is stored and retrieved is discussed in more detail. In particular, the context data is stored in the coherent memory structure discussed above. A processing element handling a task takes control of a memory area such as a so-called cache line during execution of the task; it reads context data from that cache line and, following execution of the task, writes context data back to that cache line. So, the control of the cache line is used in part to administer the scheduling and control of a particular instance of execution of a task. The memory area or cache line corresponding to a program task is used or configured to store context data relating to that program task. Each processing element is configured, in response to suspension of a program task by that processing element, to save context data relating to that program task to the respective memory region of the coherent memory circuitry Referring to FIG. 8, a task is scheduled to a processing element by the scheduling circuitry at a step 800 (for example, under the control of the operating system). At a step 810, the processing element takes control of the cache line or other memory area associated with the context data for that task. This may involve for example the processing element temporarily taking exclusive ownership of (for example, exclusive write access to) that cache line (or more generally the memory region corresponding to a program task) in the coherent domain, at least while that processing element is executing that program task.

At a step 820, the processing element loads context data from that cache line or other memory area and, at a step 830 executes the task. As before, it is noted that the loading of context data and the execution of the task can overlap in time such that the processing element may be configured to detect, after loading (at least some) context data and resuming execution of a program task, whether that processing element requires further data items generated by another of the processing elements which previously executed that program task and, when such further data items are required, to load or receive those further data items. The further data items may be stored in the same cache line or memory area or may be accessible through other memory areas. However, the context data which has to be loaded at the step 820 in order to commence execution of the task at the step 830 is provided in the controlled cache line.

At a step 840, the processing element suspends execution of the task. This may be in response to a break point in the program code, to a time period indicator 842 discussed below, to signal (external or internal) such as an interrupt received by the processor and so on. At a step 850, the processing element saves the context data to the cache line discussed above and, at a step 860, releases control of that cache line. In other words, each processing element is configured, in response to suspension of execution of a program task by that processing element, to release exclusive ownership of that memory region (corresponding to that program task).

Each processing element in these examples is therefore configured, at resumption of execution of a program task (the step 800), to take exclusive ownership (at the step 810) of a memory region of the coherent memory circuitry in which context data relating to that program task, previously saved by that processing element or another of the processing elements, is stored and to load the stored context data from that memory region.

Examples of the present techniques provide a mechanism through which virtual contexts can be—at least in part—"lazily" migrated from one compute element to another without the need for initially transferring a full context. In at least some examples, this facilitates transmission of only the state that is needed by each context.

Here, the term "lazy migration" is used to indicate that—from a data set which could be transferred from one node to another—not all of the data set is initially transferred such that other (not yet transferred) items can be transferred later, either proactively by the sending node (on a so-called "push" basis) or on request (or "on demand") by the recipient node (a so-called "pull" basis), or a combination of these. The initial transfer may not in fact comprise any data, in that all of the data is transferred later. However, in at least some examples, a combination of an initial transfer and a subsequent (later) transfer is used.

The techniques have application in the field of transferring context information, as discussed above. Lazy migration is used for a memory backed context, as discussed above, as an on demand state transfer mechanism.

A feature of example arrangements are that context data held in registers can remain valid across context swaps, reducing the need to re-load data that is needed upon return of the context to the original processing element. In other words, consider a situation in which a first processing element is executing a program task and the task is swapped to a second processing element. Context information which is required by the second processing element is transferred to the second processing element, either initially or on demand. But there may be other context information held by the first processing element which is not required by the second processing element (either at a general level, which is to say it is never required by the second processing element, or which is simply not required for that particular instance of execution of the program task by the second processing element). This context information can remain at, and under the control of, the first processing element so that if the first processing element is allocated a next or subsequent instance of execution of the program task, that retained context information can be used in that instance of execution.

Another feature of example arrangements is that only data that is needed or estimated to be needed by the processing element that the context is currently executing on is actually transferred. This can reduce one or both of (i) the time taken to transfer sufficient context data for the recipient processing element to start processing the program task, and (ii) the data traffic involving the original and recipient processing element.

Figure 9:
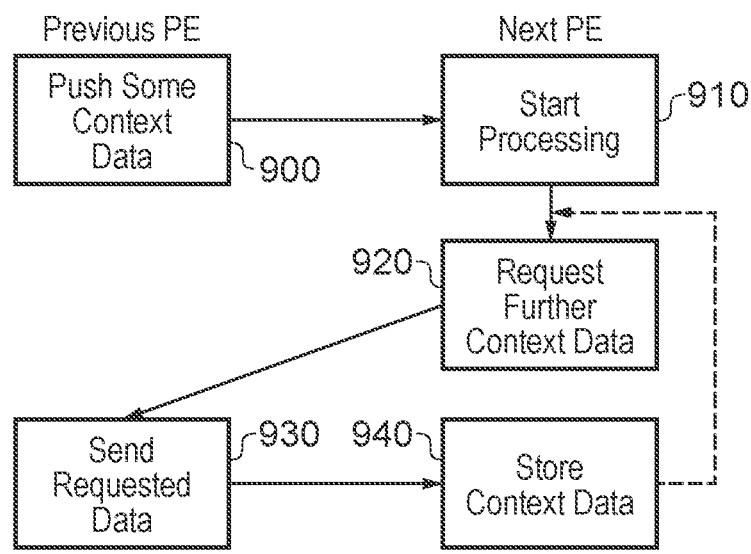
FIG. 9 is a schematic flowchart illustrating a transfer of context data.

FIG. 9 schematically illustrates a so-called lazy migration process. A left column of FIG. 9 represents operations by an original or "previous" processing element (such as a processing element which has just, or has previously, executed a program task) and a right column of FIG. 9 represents operations by a next or subsequent processing element to execute the program task. The example shown in FIG. 9 relates to lazy migration on demand.

At a step 900, the previous processing element pushes some context data (that is to say, a subset of the total available set of context data, or in other words some but not all of the total available set of context data) to the next processing element. Various alternatives for the operation of this step and the manner of selection of which context data to send at the step 900 will be discussed below with reference to FIGS. 12 to 14.

At a step 910, the next processing element starts to execute the program task using the context data sent at the step 900.

At a step 920, the next processing element detects that it needs further context data from the previous processing element. It initiates a request (for example, via the coherence network) for such additional context data which is responded to by the previous processing element or the coherent memory system at a step 930 (noting that within a coherent memory network it does not matter, to the requesting device, where the data is currently held) and the requested context data is sent to the next processing element, which stores it at a step 940. Note that (as indicated by a broken-line arrow) the steps 920, 930, 940 may be carried out multiple times during the execution of the program task by the next processing element.

Note that the transfer of further context data during execution of the task, as discussed with reference to the steps 920, 930, 940, can be initiated by any one or more of (i) the next processing element (that is to say, the processing element now executing the task), (ii) the previous processing element (with either (i) or (ii) being handled by the coherence mechanism as discussed above), (iii) a scheduler or (iv) an operating system overseeing at least some of the processing operations of the apparatus. In the case of (iii) or (iv), these arrangements can initiate a transfer via the coherence mechanism as discussed above or can instruct one of the processing elements to do so. Therefore the step 920 can in fact be an initiation by the "previous PE" (the left hand side of FIG. 9) or another entity. The example arrangement of FIG. 9 is therefore just an example.

On context allocation, memory address space is pre-allocated for a context format specified or agreed between the participating processing elements. The agreement of a context format between processing elements will be discussed further below. This pre-allocation has the effect that registers forming part of the context data can be addressed from a simple offset from the context's base address. In at least some examples, pre-allocations are small in space relative to the overall address space, even when considering larger SIMD (single instruction, multiple data) registers. Pre-allocations can also be faster in at least example arrangements than many smaller dynamic allocations through the OS. This does not preclude the ability to perform allocations dynamically, but example implementations use a single pre-allocation.

Therefore the apparatus of FIG. 1, operating according to the method of FIG. 9, provides an example of data processing apparatus comprising a group of two or more processing elements configured to execute processing instructions of a program task the processing elements being configured to provide context data relating to a program task following execution of that program task by that processing element; and to receive context data, provided by that processing element or another processing element, at resumption of execution of a program task; in which a next processing element of the group to execute a program task is configured to receive (for example, at the steps 900, 910) a first subset of the context data from a previous processing element to execute that program task and to start to execute the program task using the first subset of the context data; and in which the next processing element is configured to receive (for example, via the steps 920, 930, 940) one or more items of a second, remaining, subset of the context data during execution of the program task by that processing element. As an example of the so-called lazy pull mechanism, the next processing element is configured to initiate the transfer of the one or more items of the second subset of the context data during execution of the program task by that processing element. However, in other examples, one or more of: (i) the next processing element; (ii) the previous processing element; (iii) a scheduler; and (iv) an operating system overseeing at least some processing operations of the apparatus may initiate the transfer.

Figure 10:
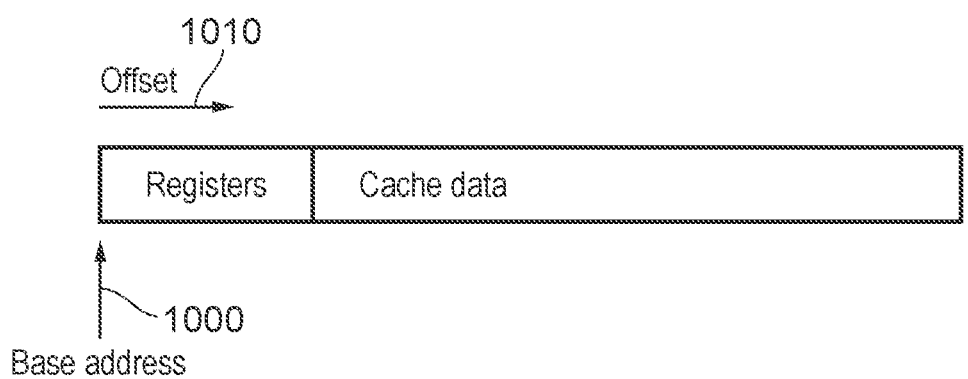
FIG. 10 schematically illustrates memory address allocation to context data.

FIG. 10 schematically illustrates a pre-allocated memory address space for the storage of context data. The memory address region is defined by a base address 1000. the agreed or specified context data items (such as the contents of registers or other data stored in memory) are arranged in a predetermined order relative to the base address so that they can be specified, in use, by a respective offset 1010 relative to the base address.

As discussed above with reference to FIGS. 7a to 7c, the interaction of the coherence system and the storage of the context data is such that, in some examples, at least some the processor registers are handled as so-called coherence end points. In other examples, the processor register data can be reflected in cache storage which is itself handled as a coherence end point. In these examples, the coherent memory circuitry includes one or more processor registers at each processing element; and each processing element is configured to store at least part of the context data used by that processing element in the one or more processor registers.

Figure 11:
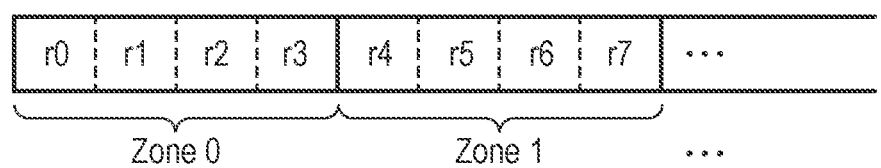
FIG. 11 schematically illustrates memory zones.

The context data may be considered, for the purposes of the discussion which follows, as multiple memory backed register "zones". Here, the term "zone" is used to indicate a group of context fields within the same coherence unit, which is to say, a memory address space region which would be swapped as a unit in response to a coherence ownership request. A zone may be formed as one or more memory addresses. FIG. 11 schematically illustrates an example of two such zones (zone 0 and zone 1). Each zone corresponds in extent to the size of a cache line in the coherence system. In the examples, the cache line size is 32 bytes and each processor register r0 . . . r7 is 8 bytes. So, a zone as illustrated comprises four such processor registers.

The zones are mapped to positions or offsets within the memory space allocated to the context so that the offset applicable to each zone (or to each register) is known to the processing elements.

When the next processing element requests exclusive access to particular lines within the coherence system (which may represent zones mapped to processor registers at the previous processing element) the control by the previous processing element is invalidated and the data pulled into the next processing element. The coherence mechanism therefore, in embodiments of the present disclosure, can conveniently provide a hardware mediated data transfer mechanism for context information from registers of one processing element to registers of another processing element. In example embodiments, a request for a specific register (as part of the context data) is mapped to a zone, which is forwarded as a coherence request if not currently present in the register file. The process would still work however if the registers were mapped or backed up to cache lines which were themselves subject to the coherence mechanism, but by the registers themselves forming part of the coherence end point the arrangement operates conveniently efficiently.

In these examples the coherent memory circuitry is configured to allocate control of memory backed register zones represented by respective groups of one or more addresses (such as the zones discussed above); and the memory region for which the processing element takes exclusive control comprises one or more of the memory backed register zones.

Various different options for lazy migration techniques will now be described by way of examples, with reference to FIGS. 12 to 14.

First Example Arrangement

In a first example arrangement, the original or previous processing element detects (for example, on an ongoing basis, for example during the most recent instance of execution of the program task by that processing element) which of its registers which form part of or which are eligible to form part of the context data is most frequently written-to. A so-called write counter forming part of the processing element can be used for this purpose.

As an alternative to detecting the most frequently written-to registers, a detection can instead be made of the most frequently accessed of those registers (again, for example, during a most recent period of execution of the program task), or in other examples, the most frequently read-from registers. Therefore, while in the present discussions reference is made to the most frequently written-to registers, it will be appreciated that this term can be substituted in the following discussion by one of the other terms just mentioned.

These arrangements provide examples of the use of selection circuitry configured to select at least some of the first subset of the context data for transmission by the previous processing element to the next processing element. The selection circuitry may, for example, be implemented by the previous processing element. In at least some examples, the selection circuitry is configured to make the selection in response to detection of a cost function associated with the context data. For example, it may detect accesses by the previous processing element to items of context data and to select at least some of the first subset of the context data in response to the detected accesses. For example, the selection circuitry is configured to select at least some of the first subset of the context data as one or more most-accessed items of context data, where the detected accesses may be write accesses (and so the number of write accesses may be indicative of the cost function)

In at least some examples, a predetermined quantity of data transfer is allocated for transmission of the most frequently written-to registers as a push transmission of context data. Therefore, in at least some examples, registers are selected for push transition in a descending order of frequency of being written-to, starting with the most frequently written-to register, until the predetermined quantity of data transfer has been filled.

This process is illustrated schematically in FIG. 12, in which at a step 1200 the original (previous) processing element detects the most written-to registers as discussed above, and at a step 1210, context data corresponding to the most written-to registers is sent as a push transfer to the next processing element.

In this arrangement, potentially the most used data gets to the next processing element first, for example to enable computation to be started (for example at the step 910 mentioned above).

The transfer can be carried out on a zone-by-zone basis.

Second Example Arrangement

In a second optional arrangement, the next processing element executes load or prefetch instructions or instructions of similar effect in order to fetch certain items or zones of context data first from the original (previous) processing element. These instructions can be initiated by the scheduler, for example, and may be based on information provided to the scheduler by the original (previous) processing element. For example, a set of zones can be indicated by the previous processing element in a reserved memory area.

In at least some examples, the following load instructions (for example, in this order) are inserted into the instruction stream of the next processing element:
  prefetches+loads pointing to the context data
  prefetches+loads pointing to data used by the context Referring to FIG. 13, at a step 1300 the next processing element executes prefetch/load instructions for the initial context data, and at a step 3130 the previous (original) processing element sends the requested context data.

This provides an example in which the next processing element is configured to execute one or more load instructions, the load instructions being configured to perform one or both of:
  acquiring one or more items of the first subset of context data; and
  acquiring one or more items of the second subset of context data.

This arrangement has the feature of starting loading as soon as possible all the data necessary, but can experience stalls until all the loads are resolved.

Third Example Arrangement

A third optional arrangement uses features of the first and second optional arrangements. In other words it incorporates loads with prefetch instructions and data from a most written-to register zone. In at least some examples, the second arrangement (prefetch instructions) is executed first and/or with higher priority, such that any remaining data transfer capacity for the initial context data (in an example in which the first subset comprises a predetermined quantity of data) is formed by push data based on a zone or a subset of a zone according to the most written-to registers.

An example of this arrangement is illustrated schematically in FIG. 14, in which a step 1400 corresponds generally to the step 1300 of FIG. 13; a step 1410 corresponds generally to the step 1310; a step 1420 corresponds generally to the step 1200 of FIG. 12, although relating only to the balance of the data transfer capacity as discussed above, and a step 1430 corresponds generally to the step 1210.

This arrangement can alleviate some of the potentially high start-up time of the second option discussed above.

All of the options described above represent a combination of an initial push mechanism (whether initiated by the previous processing element and the most written-to analysis, or by prefetch/load instructions, or both) and a subsequent lazy pull mechanism. The reasoning for this is that whilst the lazy pull helps reduce data traffic, the swap mechanism can maintain a low start-up latency of the next processing element executing the program task by using the initial push. The push mechanism can occur as soon as the time quanta of the previous processing element has been completed and the hardware scheduling entity of the node or processing element has assigned the context to a next processing element. When a context executes, the processing element executing that context has coherence ownership of a portion (or all) of the context's backing store.

The following description of the various stages of context swapping is now provided by way of example.

Context Swapping in—Starting from Thread Idle

A context is in the state "is scheduled", which is to say that the scheduler activates it upon being at the front of the run queue of the highest priority run queue that is not empty. The next processing element (to which the context is scheduled for execution) has access to the respective context base pointer from the scheduler. The nascent processor 'thread' at the next processing element does not yet have any actual thread state; which is to say, it does not yet know the program counter (PC) or have any control bits.

For this reason, the context format, in example arrangements, allocates these fields in a single zone, logically the first to be transmitted. For an out-of-order processing element, the "operational centre" of the swap-in operation is the Rename stage. For an in-order processing element, the swap-in operation is centred at the execute/post-decode micro-op injection stage. In other words, these respective processor stages are examples of positions within the processing circuitry at which the need for (currently not yet provided) context data may be detected and acted upon by initiating a pull transfer.

The next processing element will fetch the zone with the essential context values always necessary or at least desirable to make progress (privilege, Memory Management Unit (MMU) settings, PC). In this way, the next processing element will interact with memory on its own behalf. To do this, it may implement microcode that uses the load store queue (LSQ) to load data to a privileged machine-state buffer, just as an example embodiment. in such examples, the next processing element is configured to receive the first subset of the context data via a hardware mediated transfer prior to execution of the program task.

Upon being received, these values will propagate throughout the next processing element's microarchitecture, as they are often localized. For example, the PC may propagate to the processing element front-end, the privilege to decode, privilege and MMU settings to VM (virtual memory) machinery (TLB (translation lookaside buffer), table walkers). The PC is also written to the register file.

At this point, instruction fetch of instructions relating to the program task can begin. Once decoded instructions reach the rename stage, the rename table will find that no physical register is mapped to some architectural registers. At first, this applies to all the registers. But since the processing element knows the context pointer from the scheduler, it can issue a load to fetch the value of that register from the context store. In these examples, the second subset of the context data comprises configuration data (such as the register mapping data discussed above) required for execution of one or more types of program instructions by the processing elements; and the next processing element is configured to initiate the transfer of the configuration data in response to initiation of execution by the next processing element of a program instruction of the one or more types of program instructions. In at least some examples, such as examples in which the mapping of registers is required to complete execution of an instruction, the next processing element is configured to pause the execution the program instruction of the one or more types of program instructions until the configuration data has been received. As mentioned, in at least some examples, the configuration data comprises mapping data defining a mapping between architectural and physical aspects (such as registers) of the processing elements.

As a potential improvement, the processing element could use micro architectural features (for example, in microcode) to load entire zones at once, or whatever the data width limit of the LSQ is, if that mechanism is used.

As the process continues to execute, the working set of active registers will be fetched and allocated to physical registers. The operations needed to load the register file are a temporally transient phenomenon. After a short burst of traffic, by which the processor automatically handles architectural context switching on its own, execution continues as normal, but with the added coherence ownership over the backing store. But significantly, the lazy loading means that if a thread was not using some registers (examples being vector registers, floating point (FP) registers), those registers will not be swapped.

The above discussion assumes an out-of-order processing element, but in general an in-order processing element's register access stage can perform these operations instead of the rename phase, by using internal procedures of micro-operations in the same manner.

Context Swapping in—Starting from Thread Running on Another Processing Element Immediately Prior The procedure is very similar to the situation just described for an idle thread, but when assuming coherence ownership of the context backing store, the next processing element it would find some of the zones to be owned by the processing element previously executing that context.

Depending on the specific implementation details of the coherent control system, the data may be directly transferred from the previous processing element to the next (active) processing element, or the previous processing element may have to write back the values to a cache memory from which the next (active) processing element reads them.

Context Swapping Out

When a thread is descheduled (deactivated) from a processing element, again in keeping with the present embodiments, the processing element is not required to do anything immediately. Since the processing element is caching values backed by the context, it can continue to cache those values unless it is motivated or forced to flush them. If the processing element switches to another thread, physical register pressure will force some values to be written back to the context backing store. Likewise, if the thread is migrated to another processing element but is scheduled there immediately and begins executing, the other processing element demand requests for the context memory area will force write backs, just like a cache, since the register file represents a cache of the context. Finally, if the processing element intends to enter a mode to save power, as it probably would if it were to stop executing threads, the register file would be flushed and coherence ownership relinquished over the inactive context. Since the processor has to keep track of the base pointer and other bookkeeping metadata for the register files, it will be motivated, for physical resource reasons, to write back data for inactive threads. However, this can be performed at lower priority than executing the active threads, except when it must be done to facilitate progress (for example, by freeing resources) for the active thread(s).

Figure 15:
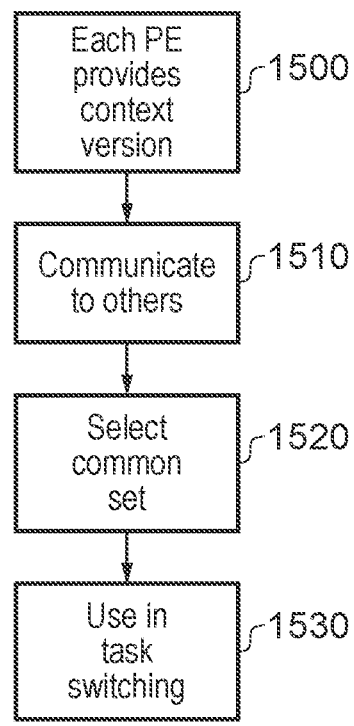
FIGS. 15 and 16 are schematic flowcharts illustrating the establishment of a common set of context data amongst a group of processing elements.

In the above description, reference was made to agreement between the processing elements of the data to be included within the context. FIG. 15 is a schematic flowchart illustrating this process.

At a step 1500, each processing element provides a context "version" to the other processing elements and this is communicated to the others at a step 1510. The context version may be an explicit list of context data items which are useable by that processing element or may be a reference to such a list, for example, a context data version number or the like which unambiguously (at least among those devices in the interconnected arrangement) defines the nature of the context data required by that processing element. In other words, in at least some examples, each processing element has respective associated format definition data to define one or more sets of data items for inclusion in the context data.

At a step 1520, a common set of context data is derived, for example by format selection circuitry (which may be distributed or provided otherwise at one or more of the processing elements or at another device in communication with the processing elements) and communicated to each processing element. In an example in which the functionality of the format selection circuitry is distributed amongst the processing elements, this involves each processing element communicating its context version to each other processing element.

At a step 1530, the common set of context data is used in task switching by each of the processing elements. This then allows a task to be switched from any processing element to any other processing element in the set because the common context data is used at each task switch.

Therefore, in at least some examples, each processing element has respective associated format definition data (such as the list or reference to a list discussed above) to define one or more sets of data items for inclusion in the context data, and this is communicated to other processing elements (for example by the format selection circuitry) at the step 1510. The format selection circuitry handles the communication of the format definition data of each of the processing elements to others of the processing elements and determines, in response to the format definition data for each of the processing elements, a common set (at the step 1520) of data items for inclusion in the context data.

Operating according to the common set of context data may mean ignoring some advanced or specific functionality of more powerful processing elements in the set of processing elements connected to the interconnect 50. For example, if one processing element has a specialised computational unit such as a coprocessor, floating point unit or arithmetic logic unit but the other processing elements do not, then it may be appropriate for the processing element having that additional capability to ignore that functionality in order to be able to provide context data compatible with the other processing elements. In other examples, in an instance of a potential mismatch between processing element capabilities and the requirements of the agreed context data format, the processing element can initiate (for example, via the scheduler) the migration of the task to another processing element.

It should also be understood that a processing element may be excluded from the set which operates according to the common set of context data, in which case the set of processing elements operating in this way is defined as those which use the common context data.

The set of data items for each processing element (defined by the format definition data applicable to that processing element) can be indicative of a set of processing capabilities of that processing element. For example, these may include one or more of: a capability to access one or more processor registers; a capability to operate according to one or more control states; and a capability to provide the function of a specialised computational unit (either by its physical presence or by its emulation). The format selection circuitry is configured to select, as a common set of data items, data items indicated by the format definition data for each processing element as being common to all of the processing elements. In some instances, however, only some of the data items which are indicated as being common to all of the processing elements are selected as the common set of data items for use in the context data during context switching. In this way, a subset of those data items indicated by the format definition data as being common to all of the processing elements can be selected. This selection could be carried out on the basis of or in response to data defining one or more criteria, for example one or more criteria selected from the list consisting of: a criterion defining a maximum latency at program task suspension or resumption; and/or a criterion defining a set of data items required by program tasks to be executed.

Considering the first of these example criteria, the latency at program task suspension or resumption (generally indicated, in the case of a single processing element, by the time periods 210, 230 in FIG. 2) can depend upon the amount of context data to be saved and to be loaded. If the amount of context data is reduced, the saving and loading may potentially be quicker. Therefore, one of the criteria used by the format selection circuitry could be a maximum latency allowable in the particular rotation in use, with a common set of context data being selected, for example according to a mapping between number or extent of the context data items and context switching latency maintained by the format selection circuitry, so that it can be saved and loaded without exceeding the maximum allowable latency period.

Considering the other example criteria, it may be that the particular program tasks to be executed do not require certain processing features such as these of a specialised computational unit (for example, a floating point unit). This criterion may be, for example, settable by the program code or by an operating system setting. If this is the case, then even though context data relating to those features may be common to the processing element in use, it can be excluded from the common set of context data by the format selection circuitry because it is not required in respect of execution of the particular program tasks to be performed.

Figure 16:
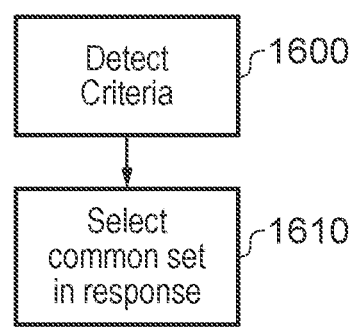

FIG. 16 schematically illustrates this process, in which, at a step 1600, the format selection circuitry detects one or more criteria as discussed above and, at a step 1610, the format selection circuitry selects a common set of context data in response to those criteria. The detection of the criteria at the step 1600 can involve consulting stored data (for example, in a reserved area of the main memory) defining the criteria, for example being use-settable data, operating system settable data, program settable data and so on.

Figure 17:
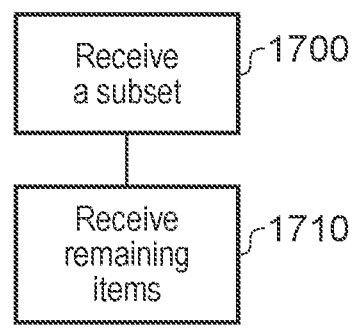
FIG. 17 is a schematic flowchart illustrating a method.

FIG. 17 schematically illustrates a method.

At a step 1700, a next processing element of a group of two or more processing elements to execute a program task, receives a first subset of context data relating to execution of a program task following execution of that program task by a previous processing element and to start to execute the program task using the first subset of the context data.

At a step 1710, the next processing element receives one or more items of a second, remaining, subset of the context data during execution of the program task by that processing element.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Data processing apparatus comprising:
 a group of two or more processing elements configured to execute processing instructions of a program task;
 each processing element of the group of processing elements being configured to provide context data relating to execution of a program task by that processing element; and to receive context data, provided by that processing element or another processing element, at resumption of execution of a program task;
 in which a next processing element of the group to execute a program task is configured to receive a first subset of the context data from a previous processing element to execute that program task and to start to execute the program task using the first subset of the context data; and
 in which the next processing element is configured to receive one or more items of a second, remaining, subset of the context data during execution of the program task by that processing element, in which one or more of: (i) the next processing element; (ii) the previous processing element; (iii) a scheduler; and (iv) an operating system overseeing at least some processing operations of the apparatus is configured to initiate the transfer of the one or more items of the second subset of the context data during execution of the program task by that processing element;
 in which:
 the second subset of the context data comprises configuration data required for execution of one or more types of program instructions by the processing elements; and
 the next processing element is configured to initiate the transfer of the configuration data in response to initiation of execution by the next processing element of a program instruction of the one or more types of program instructions; and
 the next processing element is configured to pause the execution of the program instruction of the one or more types of program instructions until the configuration data has been received.

2. Apparatus according to claim 1, in which:
the configuration data comprises mapping data defining a mapping between architectural and physical aspects of the processing elements.

3. Apparatus according to claim 1, in which the next processing element is configured to receive the first subset of the context data via a hardware mediated transfer prior to execution of the program task.

4. Apparatus according to claim 1, comprising:
coherent memory circuitry storing one or more copies of data accessible by each of the processing elements, so that data written to a memory address in the coherent memory circuitry by one processing element is consistent with data read from that memory address in the coherent memory circuitry by another of the processing elements;
in which the context data for a program task is stored by a memory region in the coherent memory circuitry; and
in which each processing element is configured to take exclusive ownership of a memory region corresponding to a program task while that processing element is executing that program task.

5. Apparatus according to claim 4, in which:
the coherent memory circuitry includes one or more processor registers at each processing element; and
each processing element is configured to store at least part of the context data used by that processing element in the one or more processor registers.

6. Apparatus according to claim 5, in which:
the coherent memory circuitry is configured to allocate control of memory backed register zones represented by respective groups of one or more addresses; and
the memory region for which the processing element takes exclusive control comprises one or more of the memory backed register zones.

7. Apparatus according to claim 1, comprising selection circuitry configured to select at least some of the first subset of the context data for transmission by the previous processing element to the next processing element.

8. Apparatus according to claim 7, in which the selection circuitry is configured to select at least some of the first subset of the context data in response to detection of a cost function associated with the context data.

9. Apparatus according to claim 8, in which the selection circuitry is configured to detect accesses by the previous processing element to items of context data and to select at least some of the first subset of the context data as one or more most-accessed items of context data.

10. Apparatus according to claim 8, in which the accesses are write accesses.

11. Apparatus according to claim 8, in which the next processing element is configured to execute one or more load instructions, the load instructions being configured to perform one or both of:
acquiring one or more items of the first subset of context data; and
acquiring one or more items of the second subset of context data.

12. Apparatus according to claim 11, in which the first subset comprises a predetermined quantity of data.

13. Apparatus according to claim 1, in which the next processing element is configured to execute one or more load instructions, the load instructions being configured to perform one or both of:
acquiring one or more items of the first subset of context data; and
acquiring one or more items of the second subset of context data.

14. Apparatus according to claim 1, in which:
each processing element has respective associated format definition data to define one or more sets of data items for inclusion in the context data;
the apparatus comprises format selection circuitry to communicate the format definition data of each of the processing elements with others of the processing elements and to determine, in response to the format definition data for each of the processing elements, a common set of data items for inclusion in the context data.

15. Apparatus according to claim 14, in which the set of data items defined by the format definition data for each processing element is indicative of a set of processing capabilities of that processing element.

16. Data processing apparatus comprising:
a group of two or more processing means for executing processing instructions of a program task;
each processing means of the group of processing means being operable to provide context data relating to a program task following execution of that program task by that processing means; and to receive context data, provided by that processing means or another processing means, at resumption of execution of a program task;
in which a next processing means of the group to execute a program task is operable to receive a first subset of the context data from a previous processing means to execute that program task and to start to execute the program task using the first subset of the context data; and
in which the next processing means is operable to receive one or more items of a second, remaining, subset of the context data during execution of the program task by that processing means, in which one or more of: (i) the next processing means; (ii) the previous processing means; (iii) a scheduler means; and (iv) an operating system overseeing at least some processing operations of the apparatus is configured to initiate the transfer of the one or more items of the second subset of the context data during execution of the program task by that processing means;
in which:
the second subset of the context data comprises configuration data required for execution of one or more types of program instructions by the processing means; and
the next processing means is configured to initiate the transfer of the configuration data in response to initiation of execution by the next processing means of a program instruction of the one or more types of program instructions; and
the next processing means is configured to pause the execution of the program instruction of the one or more types of program instructions until the configuration data has been received.

17. A method comprising:
receiving, by a next processing element of a group of two or more processing elements to execute a program task, a first subset of context data relating to execution of a program task following execution of that program task by a previous processing element, task and to start to execute the program task using the first subset of the context data;

the next processing element receiving one or more items of a second, remaining, subset of the context data during execution of the program task by that processing element;

one or more of: (i) the next processing element: (ii) the previous processing element; (iii) a scheduler; and (iv) an operating system overseeing at least some processing operations of the apparatus is configured to initiate the transfer of the one or more items of the second subset of the context data during execution of the program task by that processing element, in which the second subset of the context data comprises configuration data required for execution of one or more types of program instructions by the processing elements;

the next processing element initiating the transfer of the configuration data in response to initiation of execution by the next processing element of a program instruction of the one or more types of program instructions; and the next processing element pausing the execution of the program instruction of the one or more types of program instructions until the configuration data has been received.

* * * * *